United States Patent [19]

Kopf

[11] 4,048,461

[45] Sept. 13, 1977

[54] APPARATUS FOR WELDING CONTACT BEADS ON AN ELECTRICALLY CONDUCTIVE SUBSTRATE

[75] Inventor: Johann Kopf, Buching-Greith, Germany

[73] Assignee: Otto Bihler Maschinenfabrik GmbH & Co. KG, Halblech near Fussen, Germany

[21] Appl. No.: 632,652

[22] Filed: Nov. 17, 1975

[30] Foreign Application Priority Data

Nov. 19, 1974 Germany ............................ 2454804

[51] Int. Cl.[2] ............................................ B23K 11/02

[52] U.S. Cl. ................................ 219/104; 29/630 R; 219/79; 219/103; 219/117 R; 228/13

[58] Field of Search ................. 29/203 B, 628, 630 R, 29/630 C; 219/79, 86, 97, 100, 103, 104, 117 R, 118, 137 R, 119, 120; 228/6 A, 13

[56] References Cited

U.S. PATENT DOCUMENTS

| | | | |
|---|---|---|---|
| 2,477,894 | 8/1949 | Pityo et al. | 219/79 |
| 3,581,047 | 5/1971 | Mitchell, Jr. | 219/119 X |
| 3,635,110 | 1/1972 | Keusch | 219/79 X |
| 3,803,694 | 4/1974 | Hermann et al. | 29/203 B |
| 3,859,491 | 1/1975 | Larson | 219/117 R X |

*Primary Examiner*—J. V. Truhe
*Assistant Examiner*—N. D. Herkamp
*Attorney, Agent, or Firm*—Hans Berman

[57] ABSTRACT

Contact beads of noble metal are welded to a substrate of less corrosion-resistant metal in an apparatus in which one electrode formed with a receptacle is moved cyclically between a welding position adjacent another, stationary electrode and a remote feeding position. A gap between the electrodes receives the substrate, and blanks of contact bead material are fed into the laterally open receptacle through a stationary guide aligned with the receptacle in the feeding position of the movable electrode in a direction transverse to the direction of electrode movement.

13 Claims, 4 Drawing Figures

APPARATUS FOR WELDING CONTACT BEADS ON AN ELECTRICALLY CONDUCTIVE SUBSTRATE

This invention relates to the manufacture of composite contact members for electrical apparatus, and particularly to a method and to apparatus for welding a contact bead to a face of an electrically conductive substrate.

In its more specific aspects, the invention relates to an improvement over the apparatus disclosed in Bihler U.S. Pat. No. 3,694,614. Although the patented apparatus has been in successful operation for several years, its operating cycle is longer than is desirable in mass production of contact elements because of multiple movements of an electrode between a feeding position in which it receives a contact bead blank and the actual welding position in which current is passed between two electrodes through the blank and the substrate to which the contact bead is to be welded.

It is a primary object of this invention to provide welding apparatus of the general type disclosed in the earlier patent in which the movable electrode performs a simple short, reciprocating movement, and the length of each welding cycle is determined by the short electrode movement.

With this and other objects in view, the invention provides apparatus in which a first electrode is fixedly mounted on a normally stationary base also carrying a second, movable electrode. An actuating mechanism moves the second electrode between a welding position adjacent the first electrode and a feeding position remote from the first electrode. In both positions, the electrodes define therebetween a gap adapted to receive the afore-mentioned substrate. The second electrode is formed with a receptacle open toward the first electrode in the direction of movement of the second electrode and open also in a direction transverse to this direction of movement. A feeding mechanism sequentially feeds blanks of contact bead material to the receptacle. It includes a guide member fixedly mounted on the base and defining a path of movement for the blanks which is aligned with the receptacle in the feeding position of the second electrode, the path extending in the afore-mentioned transverse direction.

In another aspect, the invention resides in a method in which a blank of contact bead material is inserted into a receptacle of one electrode in a predetermined direction. The one electrode is moved transversely to the predetermined direction toward another electrode and toward the face of an electrically conductive substrate to which it is desired to weld a contact bead while the substrate is interposed between the electrodes until the blank engages the substrate and holds the engaged substrate in contact with the other electrode. Welding current is then passed between the electrodes through the blank and the substrate.

Other features, additional objects, and many of the attendant advantages of this invention will readily be apparent as the same becomes better understood by reference to the following detailed description of a preferred embodiment when considered in connection with the appended drawing in which.

Figure 1:
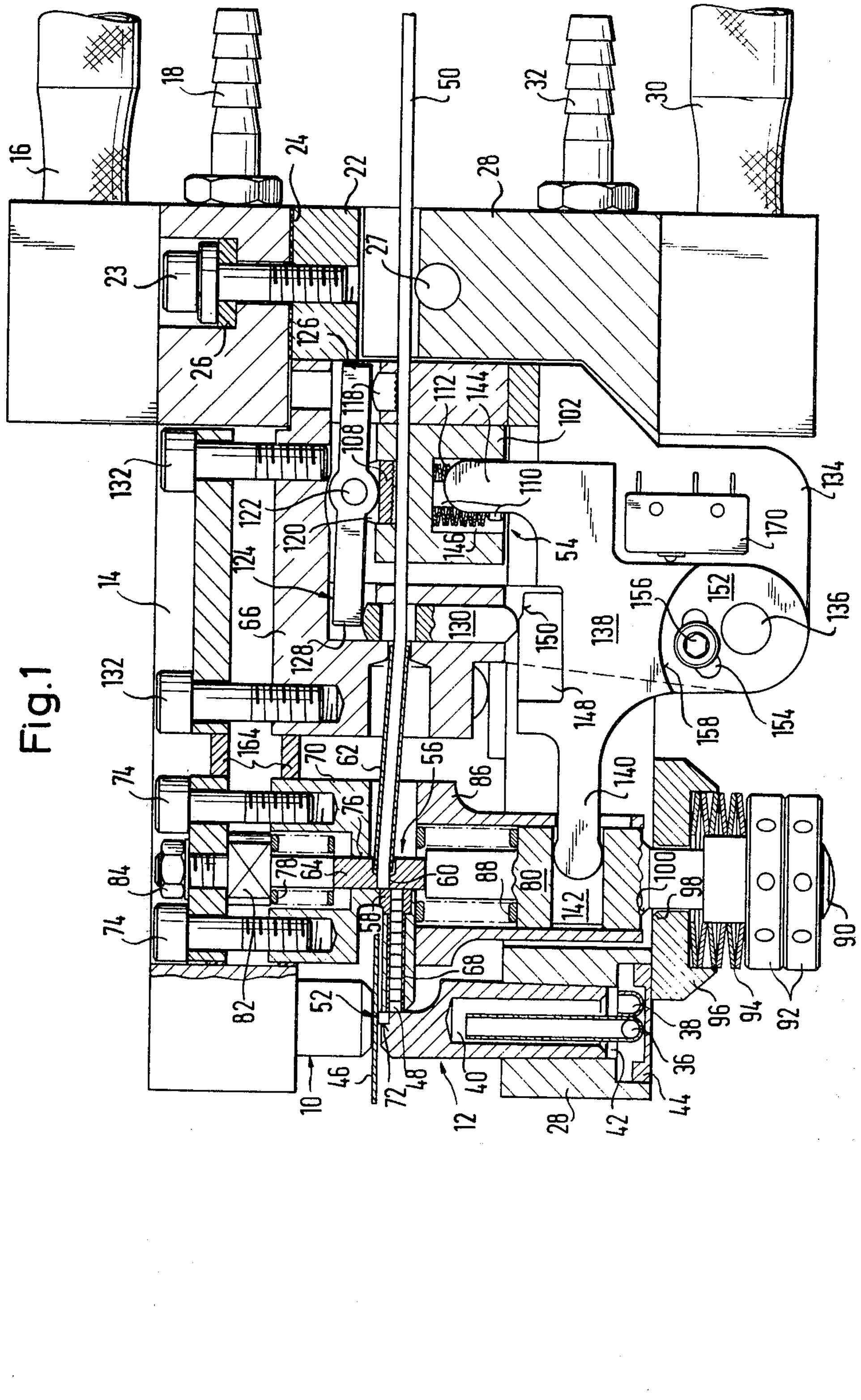
FIG. 1 shows apparatus of the invention in elevational section.

Referring now to the drawing in detail, and initially to FIG. 1, there is shown a welding apparatus whose operating elements are mounted on a heavy supporting base 14. The grounded base 14 carries a fixed electrode 10, but also provides support for an insulated movable electrode 12. Opposite conductive faces of the electrodes 12, 14 are approximately parallel in all operating positions of the movable electrode 12. The base 14 is connected to one pole of a welding generator, not shown, by a cable 16, and the electrode 10 is cooled by means of water fed to non-illustrated conduits in the base 14 by a nipple 18, the associated discharge nipple for the cooling water being obscured in the view of FIG. 1.

A mounting screw 23 is insulated from the base 14 by a plastic washer 26 and carries a forked frame 22 insulated from the base by an interposed plastic sheet 24. A carrier 28 for the movable electrode 12 is suspended in the frame 22 by means of a pivot pin 27. Electric current is supplied to the electrode 12 by a cable 30 connected to the other pole of the afore-mentioned generator, and cooling water for the electrode 12 enters a conduit 36 in the frame 22 leading to the electrode 12 through a nipple 32, a corresponding discharge nipple not being visible in FIG. 1. The electrode 12 is hollow, and its cavity 40 receives cooling water through the conduit 36 and discharges it through another conduit 38. An orifice 42 of the cavity 40 is closed by a plug 44.

Pieces of the substrate 46 to which contact beads are to be welded are sequentially inserted into the gap between the electrodes 10, 12 in a conventional manner, not shown, and not in itself relevant to this invention.

The contact beads are shaped during the welding step from blanks 48 which are practically cylindrical, longitudinal segments of a wire 50 fed toward the electrodes in continuous length by a mechanism 54 presently to be described, and chopped into identical lengths by a shearing mechanism 56 between a stationary, tubular die 58 and a movable die 64 formed with an aperture 60, the bore of the die 58 and the aperture 60 being dimensioned to receive the wire 50 with little clearance. The stationary die 58 is coaxially fastened to or integral with a guide tube 68 whose other end is blocked by a surface of the electrode 12 in the welding position of the latter. A flexible tube 62 provides a feed channel between the aperture 60 in the movable die 64 and the feeding mechanism 54 whose support 66 is fastened by screws 132 to insulating rails 164 on the base 14.

In the illustrated welding position, a blank 52 is received in a receptacle 72 of the electrode 12 which is open toward the electrode 10 in the direction of electrode movement through the aforementioned conductive face of the electrode 12, and also transversely to that direction through a lateral face of the electrode 12, lateral release of the blank 52 in the illustrated position being prevented by the end face of the guide tube 68.

Screws 74 secure the support 70 of the shearing mechanism 56 to the rails 164 on the base 14. The support 70 is formed with a guide slot 76 for the movable die 64. A helical compression spring 78 is interposed between the die 64 and the abutment head of a screw 82 mounted on the support 70 and secured by a nut 84. The spring 78 holds the die 64 in engagement with a plunger 80 guided for vertical movement in a sleeve 86 fixedly depending from the support 70.

A helical compression spring 88 is coiled about the upper reduced end of the plunger 80 in abutting engagement with the support 70 and an annular face of the plunger. The other end 90 of the plunger projects downward from the illustrated apparatus and is a spherically convex cam follower for driving cooperation with a radial cam on the output shaft of a constant-speed, electric gear motor which reciprocates the plunger in a conventional manner, not illustrated, the movements of all other mechanical elements of the welding apparatus being derived from the reciprocating movement of the plunger 80.

A stack of Belleville washers 94 is secured on the plunger 80 adjacent the cam follower portion 90 between two lock nuts 92 and a ring 96. An inner conical rim 98 of the ring 96 is shaped for conforming engagement with a conical shoulder 100 on the plunger 80 when the latter is held in its non-illustrated lowermost position by the springs 94 in the absence of forces exerted by the non-illustrated cam. When the cam holds the plunger 80 in the position shown in FIG. 1, its pressure is transmitted to the electrode 12 by the ring 96 through the springs 94 which hold the ring engaged with the electrode carrier 28.

The feed mechanism 54 includes a slide 102 guided in the support 66 in a horizontal path. The wire 50 passes through aligned openings in the support 66 and the slide 102, and these openings are transversely open to accomodate clamping shoes 108, 118 respectively. The shoe 108 is biased toward the exposed wire 50 by pull rods 110 carrying cup springs 112 interposed between an enlarged head of each rod 110 and a face of the slide 102 in a recess 146 of the latter. A bracket 120 on the shoe 108 carries a pivot pin 122 and a two-armed lever 124 fulcrumed on the pin 122. One arm 126 of the lever 124 presses the shoe 118 against the wire 50, thereby preventing movement of the wire relative to the base in the illustrated welding position of the electrode 12. The angular position of the lever 124 is controlled by an actuator bar 130 which is slidably received in the support 66 and relieves the clamping shoe 108 of the biasing pressure of the springs 112, thereby permitting the slide 102 to move while the wire 50 is stationary, when the bar 130 forces the other arm 128 of the lever 124 upward, as is shown in FIG. 1.

Two plate-shaped portions 134 of the support 66 are connected by a pivot pin 136 which supports a rocker 138 of heavy, flat sheet metal. An arm 140 of the rocker 138 is received in a recess 142 of the plunger 80 so that the rocker tilts back and forth on the pin 136 in unison with the reciprocating plunger movement. Another rocker arm 144 is received with ample clearance in the recess 146 of the slide 102 so that movement of the plunger 80 is transmitted after some lost motion to the slide 102 for moving the same in the direction of elongation of the wire 50. A cam 148 fastened on the rocker has a cam face 150 which abuttingly engages the actuating bar 130 and thereby controls the clamping shoes 108, 118. A radial cam 152 rotatably mounted on the pin 136 is coupled to the rocker 138 for joint angular movement by a clamping screw 156 threadedly engaging an axial bore in the rocker and passing through a circumferentially elongated slot 154 in the cam 152. The cam face 158 of the cam 152 spirals about the axis of the pin 136 and limits the movement of the electrode 12 away from the illustrated welding position of abutting engagement with the carrier 28, the stroke of the electrode 12 being adjusted as may be needed by changing the angular position of the cam 152.

A microswitch 170 is engaged by an edge of the rocker 138 in the illustrated welding position of the apparatus and is connected to the non-illustrated drive motor to stop the drive if the welding position is maintained after the plunger end 90 is released by the driving cam.

Starting from the illustrated welding position after passage of welding current between the electrodes 10, 12, the apparatus described above operates as follows:

When the non-illustrated drive cam releases the cam follower end 90 of the plunger 80, the spring 88 drives the plunger 80 and the die 64 downward until the aperture 60 is aligned with the stationary die 58 while the simultaneously descending electrode 12 moves away from the stationary electrode 10 into its feeding position, thereby releasing the substrate 46 and the contact bead newly formed thereon from the blank 50. The completed contact element is removed and replaced by a new substrate 46, preferably by automatic equipment conventional in itself and not shown.

The cam 148 permits the actuating bar 130 to descend along the cam face 150 under the pressure of the springs 112 when the rocker 134 is tilted counterclockwise from the illustrated position by the arm 140 moving with the plunger 80. The shoe 118 is lifted from the wire 50, and the shoe 108 clamps the wire 50 to the slide 102. After a delay caused by the lost motion of the arm 144 in the recess 146, the slide 102 is shifted toward the electrodes 10, 12, and the wire 50 is pushed through the aperture 60 into the aligned guide tube 68 while the frontmost blank 48 is pushed into the recess 72 of the electrode 12. If this movement of the slide 102 and of the wire 50 should be prevented by the blank 52 still being present in the recess 72 due to defective welding or due to failure of an operator or of the non-illustrated discharging mechanism to remove the welded contact element, the rocker 134 cannot release the microswitch 170, and the latter stops the machine after a brief delay.

When the non-illustrated drive cam raises the plunger 80 toward the illustrated position, the ring 96 lifts the electrode 12, the rocker 134 is tilted clockwise, and the die 64 returns to the illustrated position, thereby shearing the front end of the wire 50 in the tubular die 58 from the continuous wire length to form another blank 48 whose axial length is an integral fraction of the length of the guide tube 68. The cam 148 causes the lever 124 to release the shoe 108 from the wire 50 while clamping the wire to the stationary support 66 by means of the shoe 118. During the delayed return of the slide 102 to the illustrated position, the wire moves freely through the slide.

When the illustrated position is reached, and the electrode 12 holds a wire blank in abutting engagement with a substrate 46, thereby pressing the latter against the electrode 10, the welding circuit is closed by a switch, not shown, in response to the angular position of the drive cam or by a relay operated by the microswitch 170 to complete the welding cycle. The welding pressure is determined by the springs 94 which are under compressive stress at all times, and whose stress may be set by means of the nuts 92.

Figure 2:
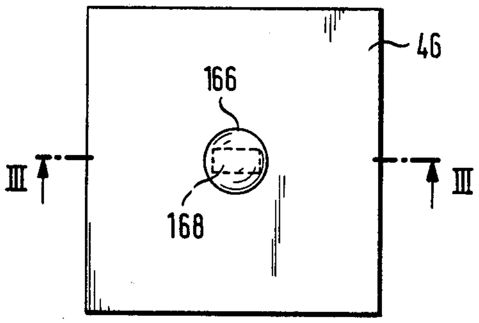
FIG. 2 is a top plan view of a contact member prepared on the apparatus of FIG. 1.
Figure 3:
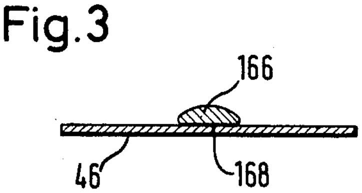
FIG. 3 shows the device of FIG. 2 in section on the line III — III.

The finished contact element is seen in FIGS. 2 and 3. The substrate 46 in this instance is a square of spring steel. The initially cylindrical blank whose axis was parallel to the face of the substrate 46 is converted to the shape of a flat, spherical arcuate bead 166 by the heat and pressure simultaneously applied during welding. The weld 168, or at least its strongest portion, is formed along a rectangular interface 168 elongated in the direction of the original blank axis.

The output of the apparatus shown in FIG. 1 is inversely proportional to the time required for reciprocating the electrode 12 between the closely spaced feeding and welding positions. This time can be made extremely short, and much shorter than the cycle time of the apparatus described in the earlier patent. The electrodes need to move apart only the small distance needed for introduction of the substrate 46, and all other movements of operating elements may be speeded up practically at will to match the electrode movement.

The apparatus may be modified in a manner obvious from the afore-mentioned patent to employ spherical blanks of noble metal for the beads to be formed, but wire segments of equal weight are more economical and are readily given the desired shape by suitable configuration of the recess 72. It was known heretofore to employ cylindrical blanks for contact beads, but such blanks were set on the substrate with their axes perpendicular to the substrate surface so that the convex contact face of the bead was formed from an approximately planar surface of the blank shaped by shearing of the wire. The surface defects unavoidably caused by shearing were not entirely remedied by welding. The convex contact faces of the beads welded in the apparatus of this invention are formed from the cylindrically convex wire surfaces generated during drawing of the wire and are of significantly greater smoothness, an important advantage in the normal application of the contact elements.

The length of each blank is determined by the stroke of the slide 102 and may be chosen by setting suitable dimensions for the recess 146, the arm 144, the receptacle 72, and associated elements. The supports 66, 70 may be shifted along the rails 164 as needed.

It is generally desirable to hold the ratio of wire diameter to blank length between 2:1 and 1:2, a blank length approximately equal to the wire diameter being generally preferred. However, at least some of the advantages of this invention are obtained with different ratios of wire diameter and blank length. If desired, wires of non-circular cross section may provide the blanks. For wires of low strength and/or small diameter, it may be advisable to shorten the guide tube 68 and to locate the shearing mechanism 56 closely adjacent the electrode 12 or to employ the electrode itself as the movable die to avoid jamming of a relatively long string of blanks conveyed through a long tubular guide.

It is advantageous to move the blank ready for welding toward a downwardly directed face of the substrate and to rely on gravity for securing the blank to the electrode. Other arrangements, however, are feasible and may be resorted to if necessary even though they may require pneumatic or other devices for preventing release of the blank from the moving electrode.

The wire 50 may be drawn by the slide 102 from a freely rotatable reel, but it may be more advantageous, particularly for welding apparatus operating at high speed, to feed the wire continuously toward the slide 102 by means of a pair of pinch rolls and to permit the wire to become alternating taut and slack between the rolls and the slide.

The welding apparatus of the invention requires but little space. It has been built successfully into a machine which produces the substrate to which contact beads are to be welded.

Figure 4:
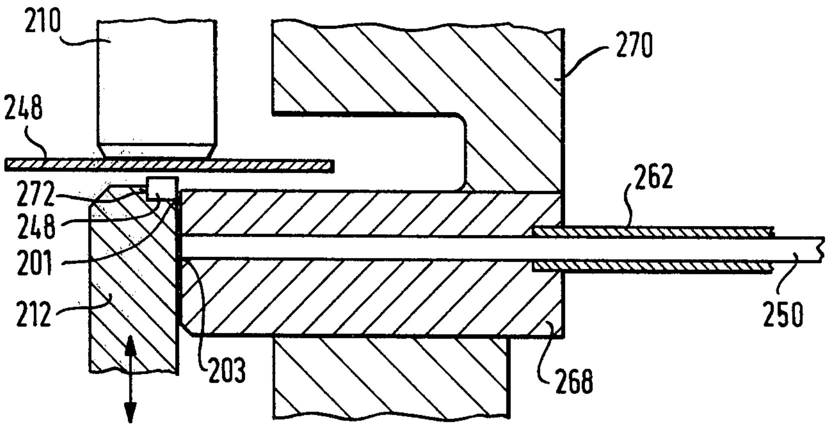
FIG. 4 is a partial view of a further embodiment of the apparatus of the invention.

FIG. 4 shows a further embodiment the reference numerals of which are increased by 200 with respect to those of FIG. 1. For further explanation reference is also made to the description of FIG. 1.

In the embodiment of FIG. 4 a guide member 268 is mounted on a stationary support 270 for feeding a wire 250 supplied through a tube 262 into a receptacle 272 which is provided in a movable electrode 212. A stationary shearing aperture 203 is formed at the end of the guide member 268 adjacent said receptacle 272 for cooperation with a shearing edge 201 provided at an opening of the receptacle 272. In a feeding position of the movable electrode 212, wherein the opening of the receptacle 272 is in alignment with the shearing aperture 203, the wire 250 is fed into the receptacle 272. Upon movement of the movable electrode 212 the shearing edge 201 moves past the shearing aperture 203 and cuts a blank 248 off the wire 250 which was previously fed into the receptacle 272. The blank 248 lying in the receptacle 272 is then welded to a substrate 246 by means of a stationary electrode 210 as is described in connection with FIG. 1.

It should be understood, of course, that the foregoing disclosure relates only to a preferred embodiment of the invention, and that it is intended to cover all changes and modifications of the embodiment of the invention chosen for the purpose of the disclosure which do not constitute departures from the spirit and scope of the appended claims.

What is claimed is:

1. Apparatus for welding a contact bead to a face of an electrically conductive substrate comprising:

a. a base;
b. a first electrode fixedly mounted on said base;
c. a second electrode movably mounted on said base;
d. actuating means for moving said second electrode between a welding position adjacent said first electrode and a feeding position remote from said first electrode,
   1. said electrodes in said positions defining therebetween a gap adapted to receive said substrate,
   2. said second electrode being formed with a receptacle open toward said first electrode in the direction of movement of said second electrode and open in a direction transverse to said direction of movement; and
e. feeding means for sequentially feeding blanks of contact bead material to said receptacle, said feeding means including a guide member fixedly mounted in said base and defining a path of movement for said contact bead material aligned with said receiptacle in said feeding position of said second electrode, said path extending in said transverse direction.

2. Apparatus as set forth in claim 1, wherein said feeding means comprises an elongated feed channel mounted on said base, said apparatus further comprising apertured shearing means for cutting said contact bead material to form said blanks, said apertured shearing means being interposed between said feed channel and said guide member for movement transverse to said path, and motion transmitting means interposed between said second electrode and said shearing means for aligning the aperture in said shearing means with said path and with said feed channel when said second electrode is in said feeding position, and for moving said shearing means out of alignment with said path when said second electrode moves from said feeding position toward said welding position.

3. Apparatus as set forth in claim 2, wherein said motion transmitting means include lost motion means for delaying operation of said feeding means during movement of said second electrode between said positions thereof.

4. Apparatus as set forth in claim 2, wherein said feeding means further include means for advancing a continuous wire stepwise through said feed channel toward said shearing means and for sequential shearing of said blanks from said continuous wire, whereby the sheared blanks are moved in said path by the advancing wire.

5. Apparatus as set forth in claim 4, wherein said motion transmitting means include means for advancing said wire when said second electrode is in said feeding position thereof.

6. Apparatus as set forth in claim 1, wherein said receptacle opening in the direction transverse to the movement of said second electrode is formed with a shearing edge and said guide member is provided with a stationary shearing aperture at the end adjacent said receptacle for cutting said contact bead material extending therethrough to form said blanks.

7. Apparatus as set forth in claim 1, wherein said electrodes have respective opposite conductive faces transverse to said direction of movement, and respective lateral faces extending in said direction, said receptacle extending inward of said conductive face of said second electrode and inward of said lateral face of said second electrode, said guide member communicating with said receptacle through the plane of said lateral face in said feeding position, said conductive faces defining said gap therebetween.

8. Apparatus as set forth in claim 7, wherein said conductive faces are substantially parallel to said transverse direction in said welding position.

9. Apparatus as set forth in claim 7, wherein said lateral face of said second electrode blocks said path of movement in said welding position.

10. A method of welding a contact bead to a face of an electrically conductive substrate which comprises:

a. inserting a blank of contact bead material into a receptacle of one welding electrode in a predetermined direction;

b. moving said one electrode transversely of said predetermined direction toward another welding electrode and toward said face while said substrate is interposed between said electrodes until said blank engages said substrate and holds the engaged substrate in contact with said other electrode; and c. passing welding current between said electrodes through said blank and said substrate.

11. A method as set forth in claim 10, wherein said blank is a longitudinal segment of an elongated wire and is cut from a continuous length of said wire prior to said inserting, said predetermined direction being the direction of elongation of said wire in said segment.

12. A method as set forth in claim 11, wherein said face is directed downward during said moving of said one electrode, said one electrode being moved upward toward said other electrode.

13. A method as set forth in claim 10, wherein said electrodes have respective opposite conductive faces substantially parallel to said predetermined direction during said passing of welding current.

* * * * *